(12) United States Patent
Yuan (10) Patent No.: US 9,528,584 B2
(45) Date of Patent: Dec. 27, 2016

(54) BELT DRIVE MECHANISM

(71) Applicant: GATES CORPORATION, Denver, CO (US)

(72) Inventor: Jing Yuan, Rochester Hills, MI (US)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 14/711,964

(22) Filed: May 14, 2015

(65) Prior Publication Data
US 2016/0333998 A1 Nov. 17, 2016

(51) Int. Cl.
*F16H 7/00* (2006.01)
*F16H 37/08* (2006.01)
*F16H 7/02* (2006.01)

(52) U.S. Cl.
CPC .......... *F16H 37/0833* (2013.01); *F16H 7/023* (2013.01)

(58) Field of Classification Search
CPC .... F16H 7/02; F16H 7/023; F05B 2260/4021; F16G 1/28; F03D 15/00
USPC .................................. 474/84, 148
See application file for complete search history.

(56) References Cited

U.S. PATENT DOCUMENTS

| | | | | |
|---|---|---|---|---|
| 169,380 A * | 11/1875 | Smith | ....................... | F16H 7/02 474/88 |
| 204,969 A * | 6/1878 | Hall | ......................... | F16H 7/02 474/87 |
| 687,146 A * | 11/1901 | Fleckenstein | ........... | F16H 27/04 474/139 |
| 847,440 A * | 3/1907 | Rivett | ....................... | F16H 7/02 474/88 |
| 1,072,834 A * | 9/1913 | Devlin | ..................... | F16H 9/26 474/84 |
| 2,058,500 A * | 10/1936 | Plucker | ................. | F03D 7/0252 290/55 |
| 2,214,541 A * | 9/1940 | Siegling | .................... | F16H 7/02 474/100 |

(Continued)

FOREIGN PATENT DOCUMENTS

EP 2391825 B1 10/2012
WO 2010086362 A2 8/2010

(Continued)

OTHER PUBLICATIONS

Wallace D. Erickson, Belt Selection and Application for Engineers, pp. 276-299, copyright 1987 by Marcel Dekker, Inc. New York, New York.

(Continued)

*Primary Examiner* — Henry Liu
(74) *Attorney, Agent, or Firm* — Jeffrey A. Thurnau, Esq.; Paul N. Dunlap, Esq.

(57) ABSTRACT

A belt drive mechanism comprising a first disc in rotational relation to a secondary shaft, a first flexible member engaged between the first disc and the secondary shaft to rotationally drive the secondary shaft about its axis of rotation, the first flexible member having a segment with a tensile load of approximately zero newtons during operation, a second flexible member engaged between the secondary shaft and an output shaft to rotationally drive the output shaft, the second flexible member having a segment with a tensile load of approximately zero newtons during operation, and the output shaft connectable to a load.

8 Claims, 6 Drawing Sheets

(56) References Cited

U.S. PATENT DOCUMENTS

| | | | | |
|---|---|---|---|---|
| 2,664,758 A * | 1/1954 | Smits | G11B 19/20 | 112/220 |
| 2,775,131 A * | 12/1956 | Smits | G11B 19/27 | 474/113 |
| 3,260,125 A * | 7/1966 | Dolza | F16H 7/023 | 474/148 |
| 3,534,634 A * | 10/1970 | Kawanami | F16H 7/14 | 474/115 |
| 3,822,485 A * | 7/1974 | Bates | D06C 7/00 | 165/89 |
| 4,006,925 A * | 2/1977 | Scherer | F03D 7/0224 | 200/80 R |
| RE30,440 E * | 12/1980 | Jeffrey | F16H 7/023 | 474/148 |
| 4,293,295 A * | 10/1981 | van Deuren | B30B 11/201 | 425/314 |
| 4,457,269 A * | 7/1984 | Beardmore | F01L 1/02 | 123/90.31 |
| 4,702,728 A * | 10/1987 | Williams | B23Q 5/04 | 474/148 |
| 4,787,259 A * | 11/1988 | Carson | F16H 19/003 | 74/10.7 |
| 4,854,923 A * | 8/1989 | Sexton | A23G 9/045 | 192/108 |
| 5,232,408 A * | 8/1993 | Brown | F16H 7/18 | 226/172 |
| 5,246,406 A * | 9/1993 | Vahabzadeh | F16G 13/04 | 474/101 |
| 5,314,386 A * | 5/1994 | Eide | F16H 7/14 | 474/150 |
| 5,385,508 A * | 1/1995 | Pietikainen | G01N 29/22 | 474/134 |
| 5,662,541 A * | 9/1997 | Roovers | F16G 1/28 | 474/149 |
| 5,957,797 A * | 9/1999 | Hong | F16G 1/00 | 474/148 |
| 6,118,194 A * | 9/2000 | Kawamura | F02B 63/04 | 290/6 |
| 6,135,907 A * | 10/2000 | Hong | F16G 1/00 | 474/148 |
| 6,239,524 B1 * | 5/2001 | Leibowitz | H02K 7/1004 | 290/6 |
| 6,707,190 B2 * | 3/2004 | Leibowitz | H02K 16/00 | 310/112 |
| 7,191,866 B2 * | 3/2007 | Sasaki | B62D 5/0424 | 180/443 |
| 7,563,156 B2 * | 7/2009 | Anderson | B24B 7/186 | 451/353 |
| 7,850,562 B2 * | 12/2010 | DeGroot | B65G 15/26 | 198/411 |
| 9,017,194 B2 * | 4/2015 | Richardson | F16H 7/02 | 474/139 |
| 9,090,439 B2 * | 7/2015 | Tjensvoll | B66D 1/20 | |
| 9,181,928 B2 * | 11/2015 | Tjensvoll | F03D 9/002 | |
| 2005/0282670 A1 * | 12/2005 | Kim | B62J 13/04 | 474/144 |
| 2006/0135305 A1 * | 6/2006 | Erez | F16H 49/001 | 474/202 |
| 2006/0154766 A1 * | 7/2006 | Lacy | F02B 67/06 | 474/148 |
| 2007/0015617 A1 * | 1/2007 | Bertolotti | F03D 1/0658 | 474/85 |
| 2011/0281677 A1 * | 11/2011 | Tjensvoll | F03D 9/002 | 474/148 |
| 2012/0152644 A1 * | 6/2012 | Kydd | B60K 6/48 | 180/366 |
| 2013/0029796 A1 * | 1/2013 | Tjensvoll | B66D 1/20 | 474/148 |
| 2013/0055858 A1 * | 3/2013 | Richardson | E21B 19/164 | 81/57.11 |
| 2014/0011617 A1 * | 1/2014 | Montag | B66C 23/84 | 474/148 |

FOREIGN PATENT DOCUMENTS

| | | |
|---|---|---|
| WO | 20150003708 A1 | 1/2015 |
| WO | 2015058770 A1 | 4/2015 |

OTHER PUBLICATIONS

European Patent Office, International Search Report application No. PCT/US2016/032503, mailing date Jul. 20, 2016.

* cited by examiner

BELT DRIVE MECHANISM

FIELD OF THE INVENTION

The invention relates to a belt drive mechanism, and more particularly, to a belt drive mechanism comprising a first flexible member and a second flexible member each having at least one segment with a tensile load of approximately zero newtons during operation.

BACKGROUND OF THE INVENTION

Wind turbines are arranged to capture energy of the wind by means of one or more rotor blades, and to transfer this energy into electrical energy by means of a generator. In some wind turbines, a drive train, including a gear arrangement, is provided for transferring rotational movements of a hub carrying the rotor blade(s) to rotational movements of the generator. The gear arrangement may comprise a number of intermeshed toothed gear wheels which provides an appropriate gearing between the rotational movements of the hub and the rotational movements of the generator shaft. As an alternative, the gear arrangement may comprise a number of pulleys being interconnected by means of a number of belts or chains, in order to transfer rotational movements between the pulleys.

To use a belt to transmit the rotation from the rotor to a generator is known from, among others, WO2015/058770A1. In order to prevent ratcheting or tooth jump, a toothed belt is installed with a preload or tension. The preload must be large enough such that the belt will not jump on the sprocket during full load operation. The preload tension is applied during installation. The preload tension can be a significant source of belt wear and noise. Improper or lack of preload may also cause tooth cracking. It can also diminish system efficiency. Preload for a toothed belt can be over 100 pounds depending belt pitch and width, see Wallace Erickson, *Belt Selection and Application for Engineers* 277-299, Marcel Dekker, Inc. (1987).

The prior art relies on a simple routing of the drive belts. Improper allocation of belt tension, routing and alignment will reduce the operational life of a drive belt representing significant cost to repair or replace. It will also reduce the overall efficiency of the turbine drive system, also representing increased costs.

Representative of the art is EP2391825 which discloses a drive device for a windmill comprising a large pulley disposed on a main shaft and at least one belt or chain adapted to transfer rotation from the pulley to a generator. The pulley is rotationally coupled to at least two secondary shafts which are disposed parallel to the main shaft. One or more belts which transfer the rotation, extend over the pulley and the secondary shafts. The secondary shafts are in turn rotationally coupled to at least one, preferably two, electric generators.

What is needed is a belt drive mechanism comprising a first flexible member and a second flexible member each having at least one segment with a tensile load of approximately zero newtons during operation. The present invention meets this need.

SUMMARY OF THE INVENTION

An aspect of the invention is to provide a belt drive mechanism comprising a first flexible member and a second flexible member each having at least one segment with a tensile load of approximately zero newtons during operation.

Other aspects of the invention will be pointed out or made obvious by the following description of the invention and the accompanying drawings.

The invention comprises a belt drive mechanism comprising a first disc in rotational relation to a secondary shaft, a first flexible member engaged between the first disc and the secondary shaft to rotationally drive the secondary shaft about its axis of rotation, the first flexible member having a segment with a tensile load of approximately zero newtons during operation, a second flexible member engaged between the secondary shaft and an output shaft to rotationally drive the output shaft, the second flexible member having a segment with a tensile load of approximately zero newtons during operation, and the output shaft connectable to a load.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 8(*a*) is a plan view of a toothed belt.

FIG. 8(*b*) is a plan view of a ribbed belt.

DETAILED DESCRIPTION OF THE PREFERRED EMBODIMENT

Figure 1:
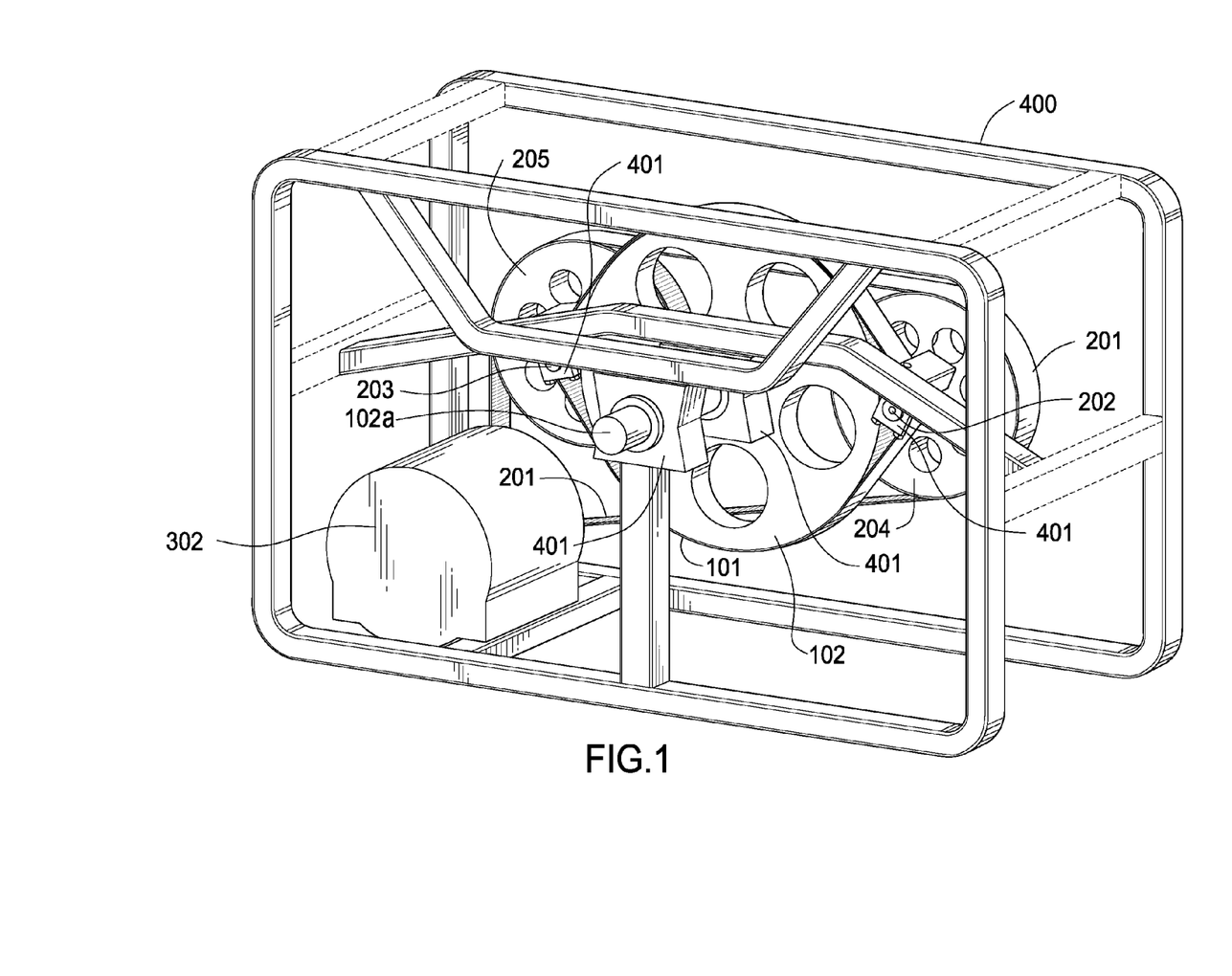
FIG. 1 is a perspective view of the transmission.

FIG. 1 is a perspective view of the transmission. The transmission is disposed in a typical nacelle frame 400. The transmission comprises first shaft 102 journalled to the frame in pillow blocks 401. Second disc 204 and 205 are each connected to their respective shafts (202 and 203) which are in turn journalled to the frame on pillow blocks 401. Flexible drive member 101 is trained between the first shaft disc and each of the secondary shafts. Rotor shaft 102*a* is connected to a rotor (not shown), such as a wind turbine prop. Shaft 102(*a*) is the shaft for power input to the transmission.

Generator 302 is mounted to the frame 400. Flexible drive member 201 is trained between each secondary shaft disc 204, 205 and the generator sprocket 300. Sprocket 300 is mounted to shaft 301. Generator 302 is the load for the system.

An inventive feature of the system is that a slack side tension for the $1^{st}$ stage flexible drive member 101 and the $2^{nd}$ stage flexible drive member 201 are each low, but greater than zero newtons upon installation. Both installation tensions then decrease, tending to zero newtons as full load torque is applied to each stage of the drive. The transmission is a step-up transmission. Most wind turbines rotate from 5 to 20 RPM depending on wind speed. The step up ratio of the instant transmission is about 80 to 1.

Figure 2:
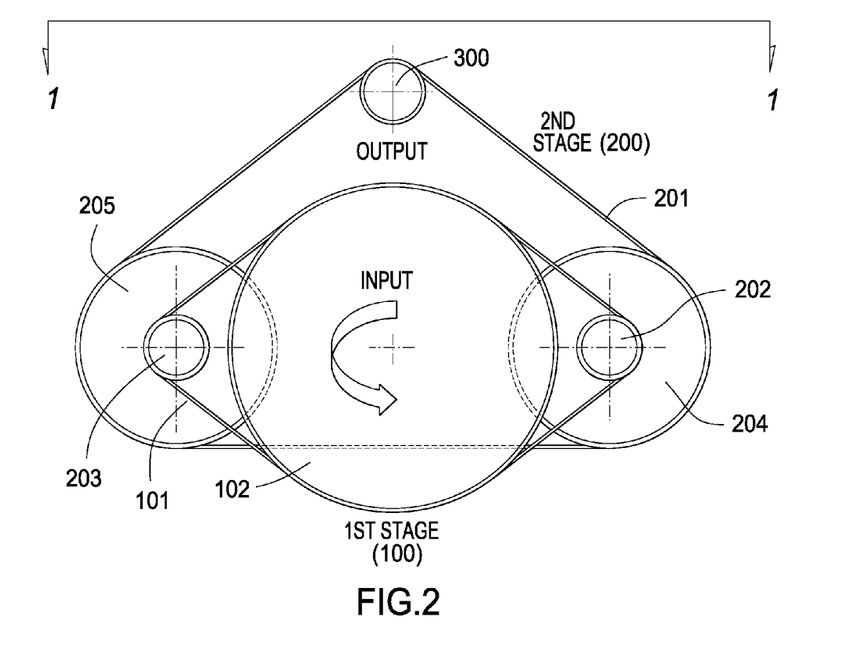
FIG. 2 is a schematic of the drive arrangement.

FIG. 2 is a schematic of the drive arrangement. The first stage drive 100 comprises a flexible drive member 101 that is trained about a first disc 102. A radius R1 establishes an outer perimeter of first disc 102. First disc 102 is attached to a rotor (not shown) such as on a wind turbine. Rotation of the first disc is caused by wind impinging on the rotor blades.

Flexible drive member 101 may comprise a toothed belt, multiple-ribbed belt, flat belt or a chain. The outer perimeter of first disc 102 is toothed, ribbed or flat to engage flexible drive member 101. Flexible drive member 101 may comprise one or more members (a,b,c) mounted side by side in parallel.

Flexible drive member 101 engages shaft 202 and shaft 203. The portion of shaft 202 and shaft 203 that engages flexible drive member 101 is configured as toothed, ribbed or flat to engage member 101. Each shaft 202 and 203 is journalled in pillow blocks 401 or other suitable bearings to allow rotation. The pillow blocks or other bearings are mounted to a frame 400. Frame 400 is mounted in a turbine nacelle (not shown).

Disc 204 is fixed to shaft 202. Disc 205 is fixed to shaft 203.

Flexible drive member 201 is trained between disc 204, disc 205 and output shaft 300. Flexible drive member 201 may comprise one or more members (a,b,c) in parallel. Flexible drive member 201 may comprise a toothed belt, multiple-ribbed belt, flat belt or chain.

The portion of sprocket 300 that engages flexible drive member 201 is configured as toothed to engage member 201. Shaft 301 can be connected to a driven load such as an electrical generator 302. The axis of rotation of shaft 301 can be disposed radially outward of the outer perimeter R1 of first disc 102.

Figure 3:
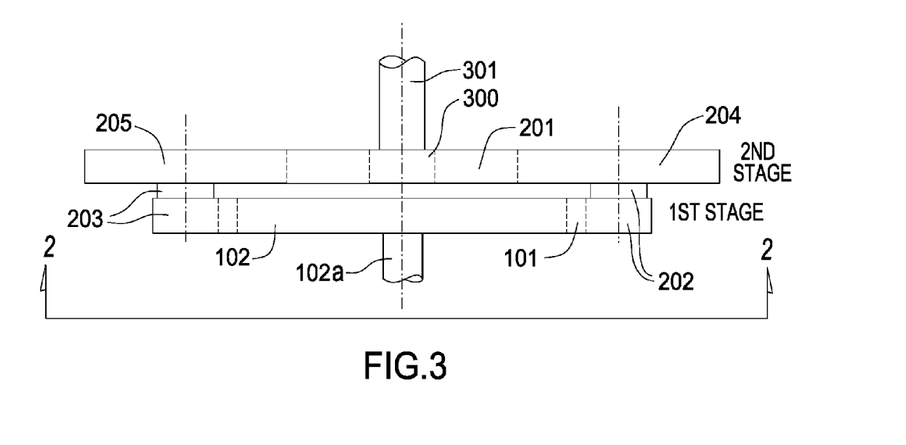
FIG. 3 is a plan view schematic of the drive arrangement.

FIG. 3 is a plan view schematic of the drive arrangement. The first stage 100 is coupled to a rotor (not shown). The second stage 200 is disposed between the first stage 100 and an output shaft 301 load, such as an electric generator 302.

Figure 4:
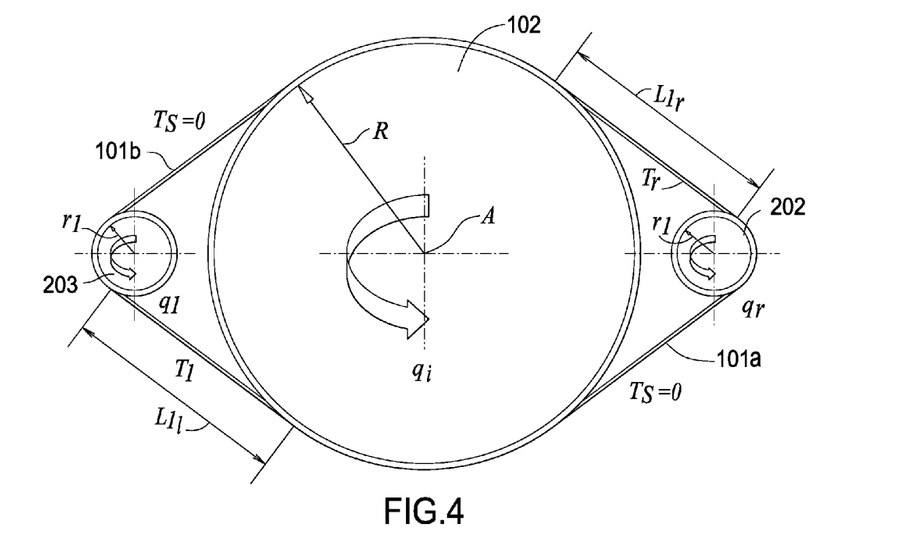
FIG. 4 is a schematic of the first stage drive.

FIG. 4 is a schematic of the first stage drive. System variables for the first stage are identified in FIG. 4. A slack side member segment is indicated by $T_s \approx 0$. Since the input torque is split between shaft 202 and shaft 203, there are two belt segments having a slack characteristic at full load, namely, segment 101a and segment 101b. "Slack" refers to having little or no tensile load. In this case the driver is disc 102 and the driven is shaft 202 and shaft 203. Direction of rotation is shown by the arrows in the figures. In an alternate embodiment an electric generator or other load may be directly connected to each shaft 202, 203.

Figure 5:
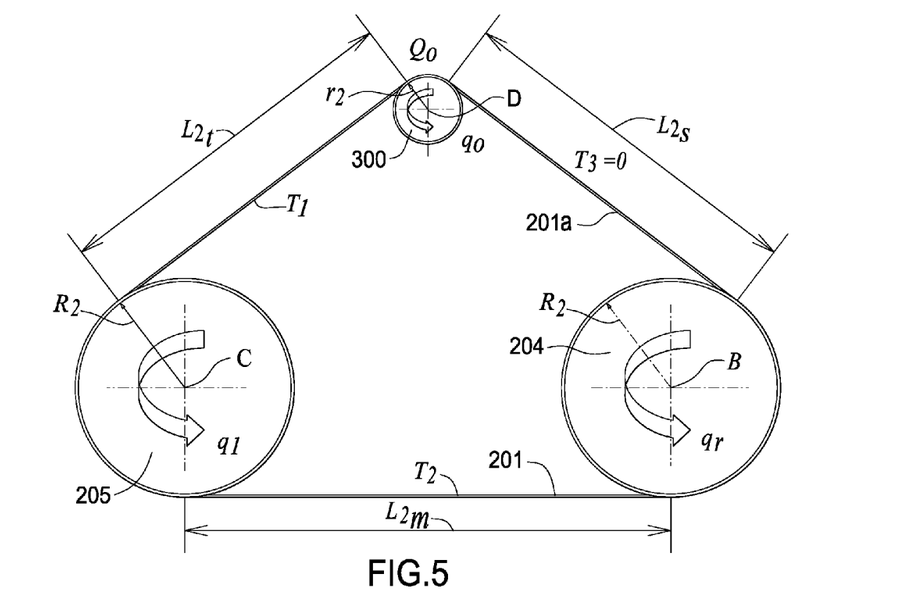
FIG. 5 is a schematic of the second stage drive.

FIG. 5 is a schematic of the second stage drive. System variables for the second stage are identified in FIG. 5. The slack side member segment is indicated by $T_3 \approx 0$. Segment 201a has a slack characteristic. For this second stage there are two drivers, 204 and 205. The driven is shaft 301. Direction of rotation is shown by the arrows. Both first stage and second stage rotate in the same direction. The direction of rotation may either be clockwise or counter-clockwise. In this example it is counter-clockwise when viewed from the rotor end (input end) as shown in FIG. 4 and FIG. 5.

An example solution for the inventive drive follows.

| Description | [unit] | Symmetric | Asymmetric |
|---|---|---|---|
| Generator power | [KW] | 500 | 500 |
| Generator speed | [RPM] | 1521 | 1521 |
| $Q_o$ | [N-m] | 3139 | 3139 |
| Pitch | [mm] | 19 | 19 |
| Modulus | [N/mm] | 175911 | 175911 |
| $w_1$ | [mm] | 500 | 500 |
| $w_2$ | [mm] | 300 | 300 |
| $L_{1l}$ | [mm] | 1100 | 1114 |
| $L_{1r}$ | [mm] | 1100 | 960 |
| $L_{2t}$ | [mm] | 3000 | 1500 |
| $L_{2m}$ | [mm] | 3000 | 2910 |
| $T_1$ | [N] | 28836 | 28836 |
| $T_2$ | [N] | 13463 | 14435 |
| $T_l$ | [N] | 87012 | 81510 |
| $T_r$ | [N] | 76200 | 81702 |
| $Q_l$ | [N-m] | 13156 | 12324 |
| $Q_r$ | [N-m] | 11521 | 12353 |
| $Q_t$ | [N-m] | 13156 | 12324 |
| $Q_m$ | [N-m] | 11521 | 12353 |
| $R_1$ | [mm] | 1376 | 1376 |
| $R_2$ | [mm] | 860 | 860 |
| $r_2$ | [mm] | 113 | 113 |
| $r_3$ | [mm] | 120 | 120 |

Each of the variables is defined as follows:

| Symbol [unit] | description |
|---|---|
| $\theta_l$ [rad] | rotation of the shaft 203 |
| $\theta_r$ [rad] | rotation of the shaft 202 |
| $\theta_i$ [rad] | rotation of the disc 102 |
| $R_1$ [mm] | radius of the disc 102 |
| $r_1$ [mm] | radius of the shaft 203 and shaft 202 |
| $T_l$ [N] | tight side tension of drive member 101 |
| $T_r$ [N] | tight side tension of drive member 101 |
| $T_s$ [N] | slack side tension of drive member 101 |
| $L_{1l}$ [mm] | 1$^{st}$ stage drive span length |
| $L_{1r}$ [mm] | 1$^{st}$ stage drive span length |
| $M_1$ [N/mm] | belt modulus belt 101 |
| $w_1$ [mm] | 1$^{st}$ stage drive 101 width |
| $Q_l$ [N-mm] | torque transmitted by shaft 203 |
| $Q_r$ [N-mm] | torque transmitted by shaft 202 |
| $Q_o$ [N-mm] | output torque of shaft 300 |
| $\theta_o$ [rad] | rotation of the shaft 301 |
| $R_2$ [mm] | radius of sprocket 205 |
| $r_2$ [mm] | radius of sprocket 300 |
| $r_3$ [mm] | radius of secondary shaft 202, 203 |
| $T_1$ [N] | tight side tension of drive member 201 |
| $T_2$ [N] | middle span tension of drive member 201 |
| $T_3$ [N] | slack side tension of drive member 201 |
| $L_{2t}$ [mm] | 2$^{nd}$ stage drive, tight span length of drive member 201 |
| $L_{2m}$ [mm] | 2$^{nd}$ stage drive, middle span length of drive member 201 |
| $L_{2s}$ [mm] | 2$^{nd}$ stage drive, slack span length of drive member 201 |
| $M_2$ [N/mm] | belt modulus of belt 201 |
| $w_2$ [mm] | 2$^{nd}$ stage drive belt 201 width |
| $Q_t$ [N-mm] | torque transmitted between the tight span $T_1$ and middle span $T_2$ |
| $Q_m$ [N-mm] | torque transmitted between the middle span $T_2$ and slack span $T_3$. |

"Symmetric" refers to a system wherein member segments 201a and $T_1$ on each side of the output shaft 301 are of equal length. "Asymmetric" refers to a system wherein segments 201a and $T_1$ are not of equal length.

For a flexible member drive with no member tensioners, also called a "lock center drive", the initial installation tension for flexible drive member 101 and flexible drive member 201, namely, $T_s$ and $T_3$, can be determined in the following manner:

1. A flexible member, in this case a toothed belt for example, is placed between two toothed sprockets of equal size on a test machine. The belt is then subjected to a static pull (load). Before the load is applied the belt is in a somewhat slack shape. In this state the sprocket hub load versus travel curve is very flat since there is no load on the belt. This is the seating region. Once the belt is seated, the two belt segments between the sprockets become straight as each takes up load. At this point sprocket load versus travel will enter a linear region showing sprocket movement (x) versus load (y). The transition knee from a horizontal line (no load: y=0) to linear (loaded) can be easily identified. The tension at the knee region is the required initial tension T0 necessary to keep the belt span segments straight. This value is the minimum value of the initial installation tension for the subject belt: $T0_{min}$. This method can be applied to member 101 and 201.

2. The maximum torque for the operational system is $Q_{max}$. Using DTR=8, one can determine the initial installation tension T01 for the given belt. First, the test system is run at T01 with $Q_{max}$. There should be no belt tooth jump during this test. Tooth jump occurs when a tooth disengages from the sprocket to skip or "jump" to the next adjacent tooth. This typically occurs in low belt tension situations.

3. The initial value of T01 is then reduced by half, T02=(T01)/2, and the test is re-run. If there is no tooth jump detected, the second value is reduced by half again, T03=(T02)/2.

4. This process is repeated until tooth jump is detected. Once tooth jump is detected the proper installation tension is reset to the previous level $T0_{n-1}$, that is, the last setting where no tooth jump was detected. The test is rerun at $T0_{n-1}$ to confirm this tension setting. At full load the final tension setting for the slack side ($T_s$ or $T_3$) should be approximately zero newtons.

For the lock center drive, the proper initial tension for the installed flexible drive member segments, $T_s$ and $T_3$, can then be achieved by:

1. Move each shaft 202 and shaft 203 radially outward, away from the axis of rotation "A" of disc 102, to set the $1^{st}$ stage drive initial tension $T_s$. This is preferably the position where all segments are straight.

2. Install the $2^{nd}$ stage sprockets 204, 205, but do not lock them down to either shaft 202, 203. A taper lock bushing is a means to achieve this. For this step each disc 204, 205 is left free to rotate about each shaft 202, 203. Any suitable lubricant can be used to temporarily lubricate the shafts.

3. Move the generator shaft 300 radially outward from axis A against the second stage flexible drive member 201 to set an initial tension $T_3$. This is preferably the position where all segments are straight.

4. Lock each of the sprockets 204, 205 onto its respective shaft 202, 203.

5. Start up the system and check for tooth jump for both drive members at full load. If jump occurs, move shaft 202, 203 or shaft 300 of the respective drive member to slightly increase the belt tension. Repeat check and adjust as needed until no tooth jump occurs at full load.

Figure 6:
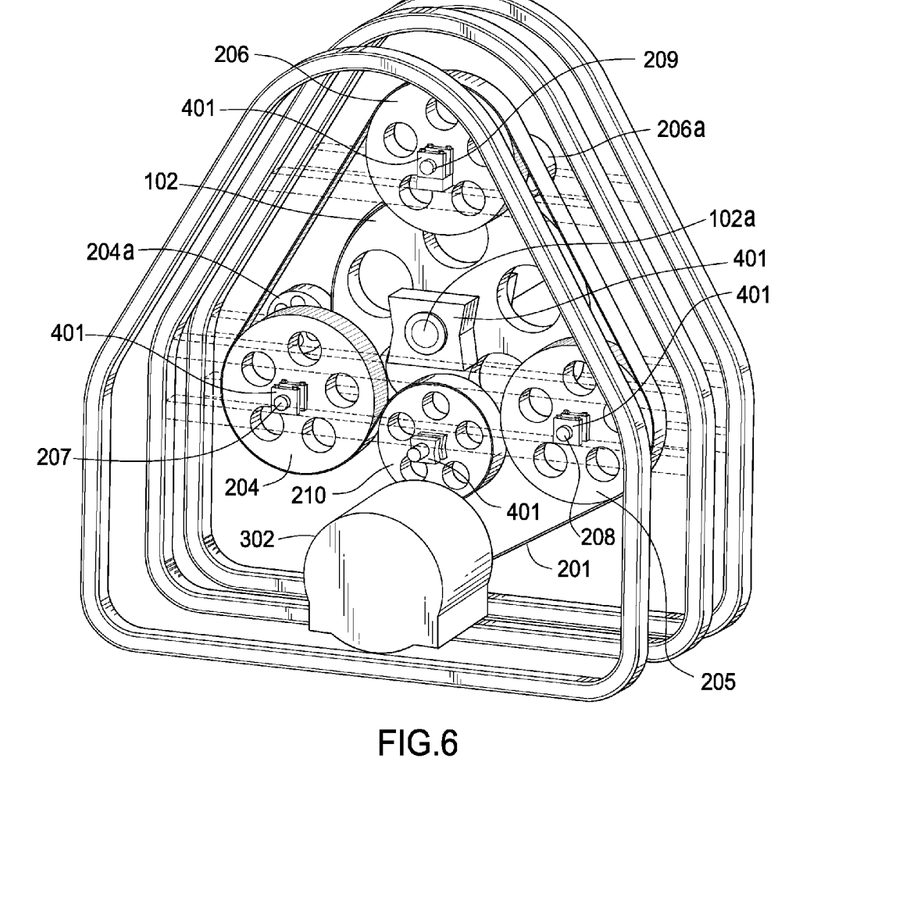
FIG. 6 is a rear perspective view of an alternate embodiment.

FIG. 6 is a rear perspective view of an alternate embodiment. In this embodiment the second stage drive comprises three toothed discs 204, 205, 206. In this embodiment power (torque) from the rotor 102 is split into thirds, each third transmitted to one of three secondary shafts. Each secondary shaft 207, 208, 209 is engaged with the flexible member 101. Each toothed disc 204, 205, 206 is connected to a respective secondary shaft 207, 208, 209. Each of the secondary shaft discs is engaged with flexible member 201. Each secondary shaft can be toothed to engage a toothed belt flexible member 201. Each secondary shaft can also be ribbed or flat.

Flexible member 101 engages an outer perimeter of first disc 102. In order to enhance power transfer from first disc 102 to flexible member 101, idlers 204a, 205a and 206a are used to press flexible member 101 into engagement with the outer perimeter of first disc 102. The additional circumference of engagement causes more teeth of flexible member 101 to engage first disc 102, which in turn decreases the loading per tooth. This in turn reduces the chance of tooth skip at elevated power conditions (high torque), where power (HP)=(torque×speed)/5252.

Each idler 204a, 205a and 206a serves to route flexible member 101 so as to increase the number of teeth engaged with each shaft 207, 208, 209. The routing wraps more of flexible member 101 about each shaft, also referred to as wrap angle (α), which then reduces the chance of tooth skip under elevated power conditions. The wrap angle (α) about each shaft 207, 208, 209 is greater than 120 degrees.

Flexible member 201 engages each disc 204, 205, 206. Flexible member 201 also engages idler disc 210 and toothed disc or sprocket 300. Sprocket 300 is connected to a load such as a generator 302. Disc 210 is used to increase the wrap angle (β) of the flexible member 201 about sprocket 300 to greater than 120 degrees and up to approximately 180 degrees.

Figure 7:
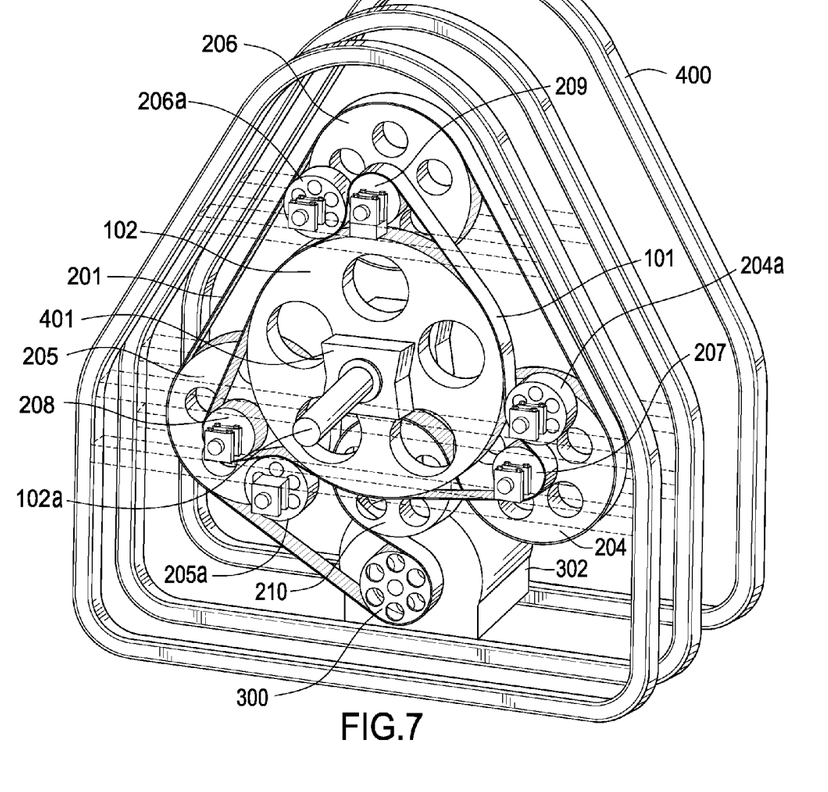
FIG. 7 is a front perspective view of an alternate embodiment.

FIG. 7 is a front perspective view of an alternate embodiment. Each idler 204a, 205a and 206a routes flexible member 101 to establish a suitable wrap angle α about each shaft 207, 208, 209. As such each idler helps to determine belt routing, but is not used to apply a significant preload to the belt, therefore the condition $T_s \approx 0$ is maintained at full load.

Idler disc 210 routes flexible member 201 to establish a suitable wrap angle β. As such idler disc 210 helps to determine belt routing but is not used to apply a significant preload to the belt, therefore the condition $T_3 \approx 0$ is maintained at full load.

Figure 8A:
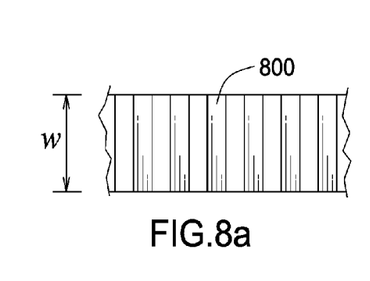

FIG. 8(a) is a plan view of a toothed belt. A toothed belt comprises teeth 800 which extend across a width (w) of the belt.

Figure 8B:
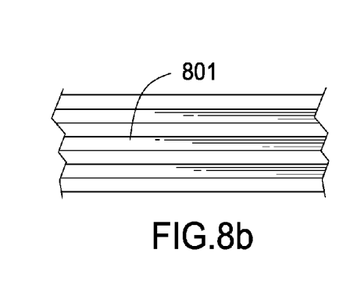

FIG. 8(b) is a plan view of a ribbed belt. A ribbed belt comprises ribs 801 which extend in the longitudinal (endless) direction of the belt. A flat belt comprises no teeth or ribs.

Figure 9:
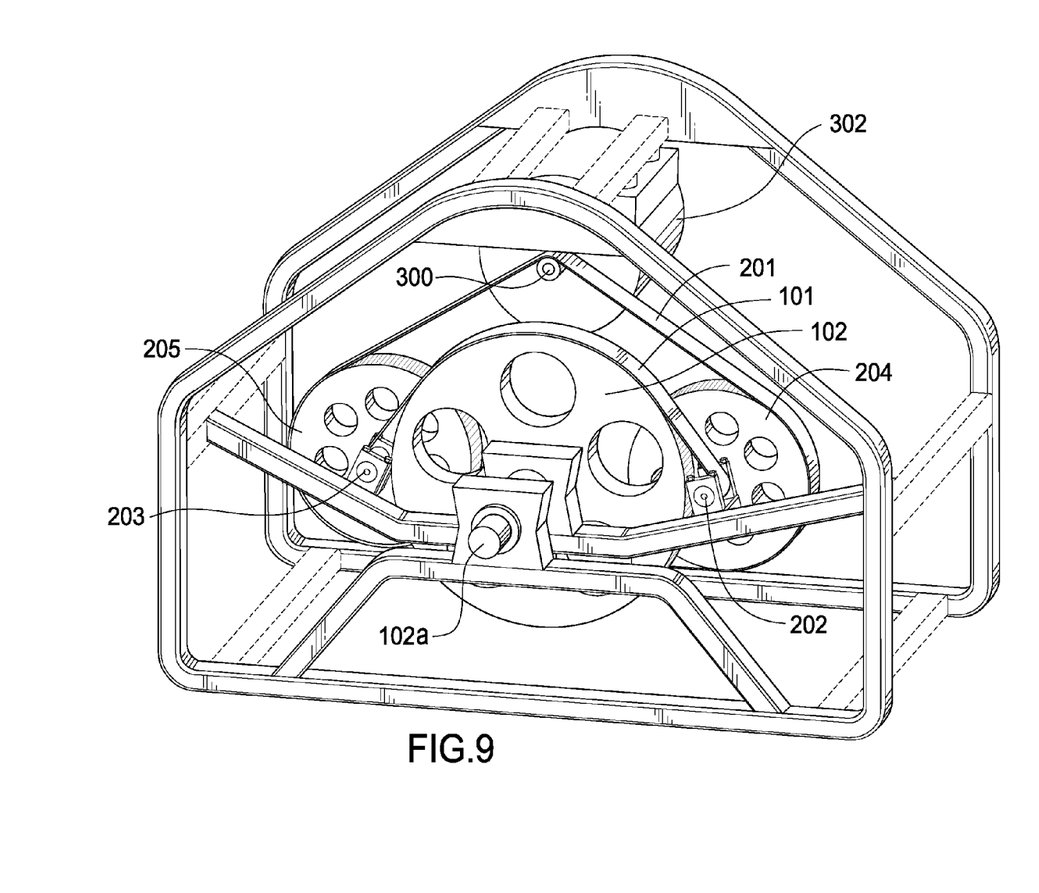
FIG. 9 is a front perspective view of the drive schematic as shown in FIG. 2.

FIG. 9 is a front perspective view of the drive schematic in FIG. 2. Shaft 102a can be connected to a propeller shaft (not shown). Shaft 301 can be connected to a load such as a generator.

Although a form of the invention has been described herein, it will be obvious to those skilled in the art that variations may be made in the construction and relation of parts without departing from the spirit and scope of the invention described herein.

I claim:

1. A flexible member transmission comprising:
    a first disc (102) arranged for rotation on a first shaft (102a);
    at least two secondary shafts (202,203) arranged for rotation in parallel to the first shaft, each secondary shaft having a secondary shaft disc (204,205) mounted thereon;
    a first flexible member (101) rotationally connecting the first disc to each of the two secondary shafts, the first flexible member having at least one segment with a tensile load of approximately zero newtons during operation;

each secondary shaft disc rotationally connected to an output shaft (300) by a second flexible member (201), the second flexible member having at least one segment with a tensile load of approximately zero newtons during operation.

2. The transmission as in claim 1, wherein the first flexible member comprises a toothed belt.

3. The transmission as in claim 1, wherein the second flexible member comprises a toothed belt.

4. The transmission as in claim 1, wherein the at least one segment of the second flexible member has an installation tension greater than zero newtons.

5. The transmission as in claim 1, wherein the at least one segment of the first flexible member has an installation tensioner greater than zero newtons.

6. The transmission as in claim 1, wherein each segment of the second flexible member on each side of the output shaft are of equal length.

7. The transmission as in claim 1, wherein operation is full load operation.

8. The transmission as in claim 1, wherein the output shaft is connected to an electric generator.

* * * * *